(12) United States Patent
Danneberg et al.

(10) Patent No.: US 12,172,702 B2
(45) Date of Patent: Dec. 24, 2024

(54) FLOOR ASSEMBLY FOR AN ELECTRICALLY OPERABLE MOTOR VEHICLE

(71) Applicant: Bayerische Motoren Werke Aktiengesellschaft, Munich (DE)

(72) Inventors: Jan Danneberg, Munich (DE); Marcel Meder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 161 days.

(21) Appl. No.: 17/763,237

(22) PCT Filed: Nov. 6, 2020

(86) PCT No.: PCT/EP2020/081277
§ 371 (c)(1),
(2) Date: Mar. 24, 2022

(87) PCT Pub. No.: WO2021/089775
PCT Pub. Date: May 14, 2021

(65) Prior Publication Data
US 2022/0340212 A1    Oct. 27, 2022

(30) Foreign Application Priority Data
Nov. 7, 2019 (DE) ..................... 10 2019 130 050.9

(51) Int. Cl.
*B62D 25/20* (2006.01)
*B60K 1/04* (2019.01)
(Continued)

(52) U.S. Cl.
CPC ............ *B62D 25/2036* (2013.01); *B60K 1/04* (2013.01); *B62D 21/157* (2013.01); *B62D 25/025* (2013.01); *B60K 2001/0438* (2013.01)

(58) Field of Classification Search
CPC .............. B62D 25/025; B62D 25/2036; B62D 21/157; B60K 2001/0438
(Continued)

(56) References Cited

U.S. PATENT DOCUMENTS 10,293,860 B1    5/2019  Cooper et al.
2013/0026786 A1  1/2013  Saeki
(Continued)

FOREIGN PATENT DOCUMENTS

CN     102897010 A    1/2013
CN     105939877 A    9/2016
(Continued)

OTHER PUBLICATIONS

English translation of Chinese-language Office Action issued in Chinese Application No. 202080066440.0 dated Jun. 2, 2023 (6 pages).

(Continued)

*Primary Examiner* — Dennis H Pedder
(74) *Attorney, Agent, or Firm* — Crowell & Moring LLP

(57) ABSTRACT

A floor assembly for an electrically operable motor vehicle includes a vehicle floor, which runs on top of an energy storage device for driving the vehicle, has at least one floor element, and to which a side sill is attached on each outer side. In order to ensure that the energy storage device below the vehicle floor is protected against excessive damage in the event of a crash, in particular a side-impact crash, a first, outer, deformation zone of the floor assembly is provided in the region of the side sills, with the energy storage device being arranged at a distance from the first, outer deformation zone in the transverse direction of the vehicle so as to form a second, inner, deformation zone. The first, outer, deformation zone is deformable under a lower load level than the second, inner, deformation zone.

9 Claims, 6 Drawing Sheets

(51) Int. Cl.
 B62D 21/15 (2006.01)
 B62D 25/02 (2006.01)
(58) Field of Classification Search
 USPC ............ 296/209, 193.07, 204, 187.12
 See application file for complete search history.

(56) References Cited

U.S. PATENT DOCUMENTS

| | | | |
|---|---|---|---|
| 2013/0088044 | A1 | 4/2013 | Charbonneau et al. |
| 2016/0347160 | A1 | 12/2016 | Landgraf |
| 2017/0210426 | A1* | 7/2017 | Gao ............... B62D 29/008 |
| 2017/0210427 | A1* | 7/2017 | Akhlaque-e-rasul ............... B62D 21/157 |
| 2018/0065677 | A1* | 3/2018 | Tutzer ............... B62D 21/157 |
| 2019/0031241 | A1* | 1/2019 | Ayukawa ............... B60J 5/0456 |
| 2019/0217895 | A1* | 7/2019 | Kasai ............... B62D 21/157 |
| 2019/0248416 | A1* | 8/2019 | Kato ............... B62D 21/157 |
| 2020/0140021 | A1 | 5/2020 | Grottke et al. |
| 2022/0016966 | A1 | 1/2022 | Kecalevic et al. |

FOREIGN PATENT DOCUMENTS

| | | |
|---|---|---|
| CN | 109291768 A | 2/2019 |
| CN | 110027627 A | 7/2019 |
| DE | 20 2016 107 254 U1 | 3/2017 |
| DE | 10 2018 206 118 A1 | 10/2019 |
| DE | 10 2018 127 375 A1 | 5/2020 |
| DE | 10 2018 132 258 A1 | 6/2020 |
| EP | 2 486 609 A2 | 6/2012 |
| EP | 3 293 084 A1 | 3/2018 |

OTHER PUBLICATIONS

International Search Report (PCT/ISA/210) issued in PCT Application No. PCT/EP2020/081277 dated Feb. 12, 2021 with English translation (five (5) pages).

German-language Written Opinion (PCT/ISA/237) issued in PCT Application No. PCT/EP2020/081277 dated Feb. 12, 2021 (six (6) pages).

German-language Search Report issued in German Application No. 10 2019 130 050.9 dated Sep. 23, 2020 with partial English translation (12 pages).

* cited by examiner

FLOOR ASSEMBLY FOR AN ELECTRICALLY OPERABLE MOTOR VEHICLE

BACKGROUND AND SUMMARY

The invention relates to a floor assembly for an electrically operable car.

EP 2 468 609 A2 has already disclosed a floor assembly of this type, in the case of which a vehicle floor is arranged on the upper side of an energy storage device for a drive of the car. The vehicle floor comprises at least one floor element and is delimited on the outer side by way of respective side sills.

It is well known that it is of particularly high importance precisely in the case of floor assemblies of cars with an energy storage device arranged below the vehicle floor that this energy storage device remains at least substantially intact in the case of a crash, in particular in the case of a side-on crash. This is difficult, however, in particular when the respective battery modules of the energy storage device are arranged in a longitudinal manner, for example, on account of the space conditions or due to other requirements, and crossmembers are accordingly not possible within the energy storage device or within its storage housing.

It is an object of the invention to provide a floor assembly of the type mentioned at the outset, in the case of which the energy storage device is protected particularly favorably in the case of a crash, in particular in the case of a side-on crash.

According to the invention, this object is achieved by way of a floor assembly with the features of the independent claim. Favorable developments of the invention are the subject matter of the dependent claims.

The floor assembly according to the invention has a vehicle floor which is on the upper side of an energy storage device, has at least one floor element, and is adjoined on the outer side by respective side sills. In order to achieve a situation here where the energy storage device below the vehicle floor is protected against excessive damage particularly favorably in the case of a crash, in particular in the case of a side-on crash, it is provided according to the invention that a first, outer deformation zone of the floor assembly which is configured in the region of the side sills, from which deformation zone the energy storage device is arranged at a spacing in the vehicle transverse direction with the formation of a second, inner deformation zone, it being possible for the first, outer deformation zone to be deformed under a lower load level than the second, inner deformation zone. According to the invention, it is accordingly provided for an outer deformation zone and an inner deformation zone of the floor assembly to be provided on the outer side of the energy storage device, it being possible for the first, outer deformation zone to be deformed under a lower load level than the second, inner deformation zone. Therefore, a sequence is provided within the two deformation zones, with the result that first of all the first, outer deformation zone is deformed with absorption of impact energy and with support on the second, inner deformation zone, whereupon the second, inner deformation zone which can be deformed at a load level which is higher in contrast and accordingly first of all provides support for the first, outer deformation zone is subsequently deformed with absorption of impact energy and with support on an inner, stable zone.

In the case of important accident scenarios, the second, inner deformation zone is therefore also deformed with absorption of impact energy, the second, inner deformation zone then being supported on the inner side on the inner zone of the floor assembly which is provided in the region of the storage device. As a result, a graduation of the load level is provided within the respective deformation zones in an optimum way, with the result that the energy storage device which is arranged on the inner side of these two deformation zones is protected in an optimum way even in the case of severe side-on crashes and is not deformed excessively.

In this context, furthermore, it has been shown to be advantageous if the second, inner deformation zone can be deformed under a lower load level than the floor assembly in the region of the energy storage device. In the region of the energy storage device, the floor assembly is namely preferably stiffened in the manner of a passenger safety cell in such a way that no deformations which are significant or, for example, jeopardize the tightness of the energy storage device can occur in this region. Rather, the complete energy is preferably built up within the two deformation zones, with the result that the robust inner zone which is provided in the region of the energy storage device of the floor assembly protects the energy storage device and is maintained as far as possible in an undeformed state.

A further advantageous embodiment of the invention provides that at least one floor crossmember is provided on the upper side of the floor element of the vehicle floor, which floor crossmember can be deformed in the region of the second, inner deformation zone under a lower load level than in the region above the energy storage device. Accordingly, the rigidity of the floor assembly in the region of the energy storage device which forms the inner zone of the floor assembly can be stiffened and increased particularly favorably by way of floor crossmembers of this type.

A further advantageous embodiment of the invention provides that a respective energy absorption element is provided in a sill hollow chamber of the respective side sill. Accordingly, the respective side sill preferably forms the first, outer deformation zone, which respective side sill is preferably equipped with the corresponding energy absorption element, in order to be able to take or absorb a correspondingly great amount of impact energy in a first phase of the side-on impact.

A further advantageous embodiment of the invention provides that the energy absorption element is arranged merely in an upper part region of the sill hollow chamber of the respective side sill. Therefore, the energy storage device is preferably arranged at a height location or position in relation to the vehicle vertical direction which corresponds approximately to the position of the vehicle floor. This results in a particularly favorable support of the respective energy absorption elements on the vehicle floor which is arranged on the inner side thereof, an upper load path being configured. This is important, in particular, if a second, lower load path cannot be configured on account of the absence of crossmembers in the region of the energy storage device or on account of the spacing of the storage housing from the side sill. As a result of the arrangement of the energy absorption element at a height location with the vehicle floor, an introduction of torque therefore cannot occur either, as a consequence of which, for example, the energy absorption element is twisted below the vehicle floor about a torsion axis which extends in the vehicle longitudinal direction and, accordingly, cannot exploit its complete energy absorption capability.

In this context, it has been shown to be advantageous, furthermore, if the respective energy absorption element is arranged in the vehicle vertical direction at least substantially in an overlap with the floor crossmembers which are situated on the upper side of the respective floor element of the vehicle floor. As a result, an optimum support of the energy absorption element toward the vehicle center on the vehicle floor and on the respective bottom crossmembers and the formation of a corresponding load path are in turn achieved, without it being possible for the above-described torsion processes of the respective energy absorption element and accordingly a reduction in its performance capability for absorbing impact energy to occur.

As has already been described in the preceding text, the present floor assembly is suitable, in particular, in the use of energy storage devices which are configured to be free from crossmembers, in particular within the storage housing of the energy absorption elements. Therefore, the energy storage device can be fitted with the respective battery modules in a particularly favorable way, in particular even in a longitudinal arrangement, without crossmembers within the storage housing of the energy storage device having a disadvantageous effect. As described above, the loss of the described crossmembers does not have a disadvantageous effect, however, on the safety concept in the case of a side-on impact on the floor assembly, since, as stated, the two deformation zones are provided which protect the inner, at least substantially rigid zone of the floor assembly.

Finally, it has been shown to be advantageous if a respective longitudinal beam is provided on the lower side of the vehicle floor and on the outer side of the energy storage device, which respective longitudinal beam delimits the second, inner deformation zone toward the vehicle center. In particular, the rigidity of the inner zone of the floor assembly in the region of the energy storage device is further improved by way of this longitudinal beam.

Further details and features of the invention result from the claims, the figures and the description of the figures. The features and combinations of features mentioned above in the description and the features and combinations of features mentioned in the following text in the description of the figures and/or shown solely in the figures can be used not only in the respective specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
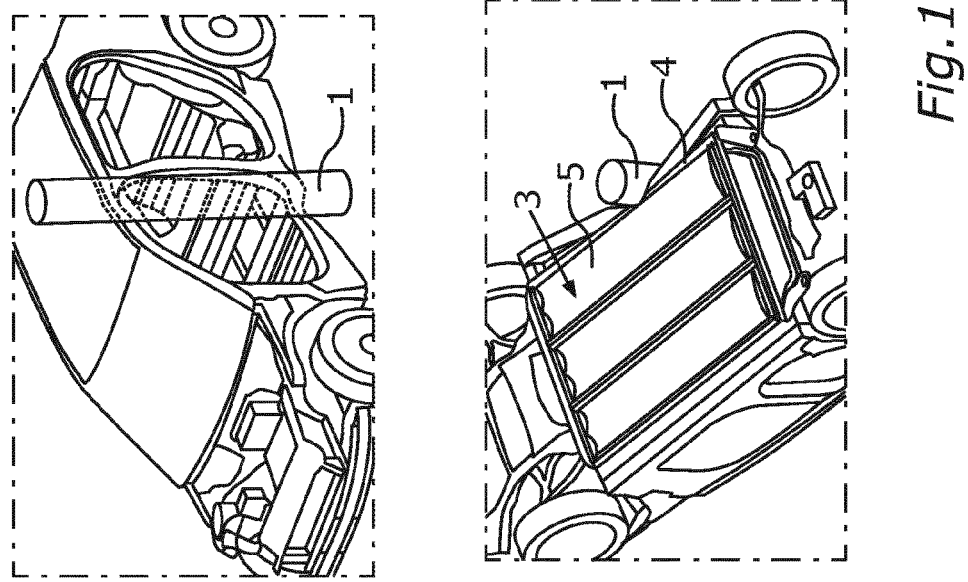
FIG. 1 in each case shows details of a perspective side view and bottom view of an electrically operable car with a floor assembly with an energy storage device which is arranged on the lower side of a vehicle floor, the two left-hand illustrations showing the car before an impact with a post, and the two right-hand illustrations showing it after an impact with a post.
Figure 1:
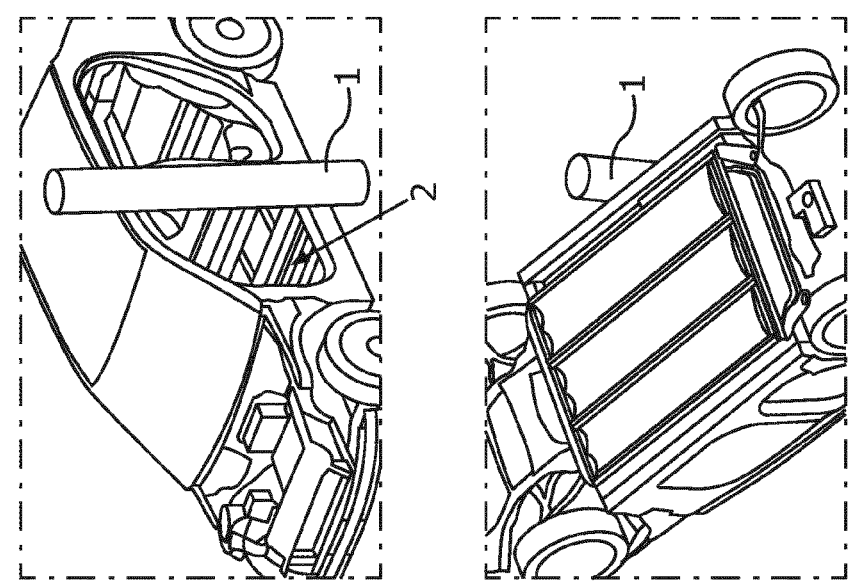

FIG. 1 shows an electrically drivable car in respective details of perspective side views and bottom views. Here, the two left-hand illustrations show a respective side view and bottom view of the car before a side-on crash with a post 1, and the two right-hand illustrations show a respective view after the impact with the post 1.

It can be seen here, in particular, from the two bottom views according to the two lower illustrations in FIG. 1 that the electrically operable car has an energy storage device 3 on the lower side of a vehicle floor 2, which energy storage device 3 is shown here without a lower housing part of a storage housing 4 for the sake of clarity. As will still be described in the further text in the present case, this storage housing 4 can be formed partially and in the present case on the upper side by way of the vehicle floor 2 itself. In this case, the vehicle floor 2 accordingly forms substantially an upper housing part of the storage housing 4, which upper housing part is supplemented and closed in a gas-tight manner on the lower side by way of a further housing part. As an alternative to this, however, it is also contemplated for a completely closed storage housing 4 to be used which is arranged and fastened per se on/to the lower side of the vehicle floor 2.

It can be seen here from the bottom views according to FIG. 1 that, in the present case, respective battery modules 5 are arranged in a longitudinal arrangement, that is to say oriented in the vehicle longitudinal direction. In the case of a longitudinal arrangement of this type of the battery modules 5, crossmembers within the storage housing 4 or within the energy storage device 3 are not possible. Accordingly, in the present case, the energy storage device 3 and its storage housing 4 are configured in a manner which is free from crossmembers of this type. This also means, however, that corresponding measures have to be taken, in order to achieve sufficient protection against excessive damage, in particular, for the energy storage device 3 in the case of a side-on impact, in particular in the case of a post impact which is shown here in the two right-hand illustrations of FIG. 1 in the course of the accident scenario.

Figure 2:
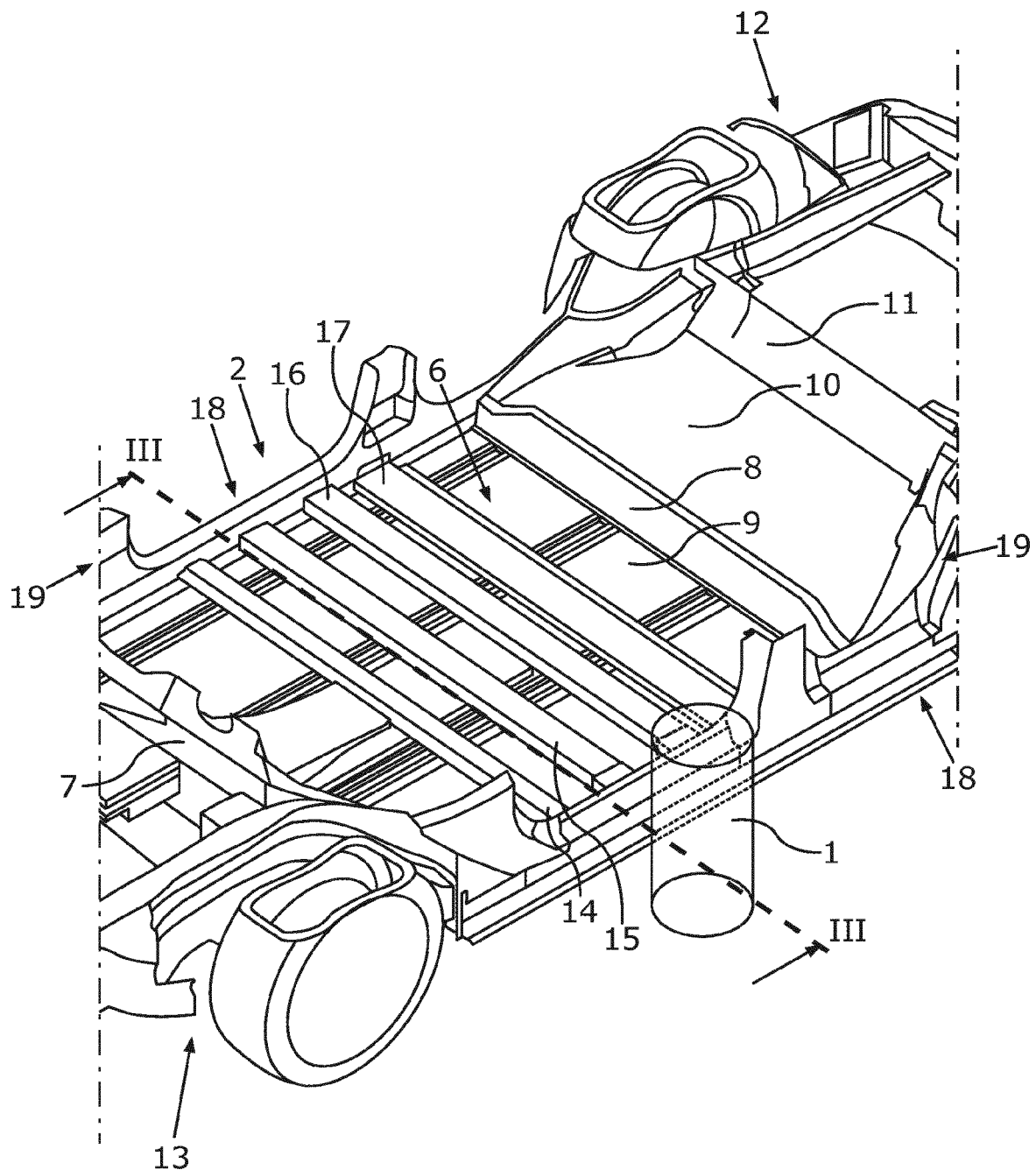
FIG. 2 shows details of a perspective view obliquely from above of the floor assembly of the car according to FIG. 1, it being possible, in particular, for respective crossmembers to be seen which are arranged above a floor element of the vehicle floor and extend between respective side sills.

In a horizontal sectional view of the body of the car, FIG. 2 shows its floor assembly with the vehicle floor 2 which is arranged on the upper side of the energy storage device 3 and comprises at least one floor element 9 in the region of a main floor 6 which extends toward the front at least as far as a front bulkhead 7 and toward the rear at least as far as a heel plate 8. This floor element 9 can be produced, for example, as a single-piece floor metal plate or from a different material. The floor element 9 can of course also be configured in multiple pieces. Behind the heel plate 8, a rear floor element 10 extends as far as a crossmember 11, at which the vehicle floor 2 and the floor assembly merge into a rear part of the vehicle 12. Toward the front, the front part of the vehicle 13 adjoins the floor assembly on the front side of the bulkhead 7.

As can then be seen from FIG. 2, furthermore, the vehicle floor 2 has a plurality of respective floor crossmembers 14, 15, 16, 17 on the upper side of the floor element 9 in the region of the main floor 6, the shape of which floor crossmembers 14, 15, 16, 17 will be explained in greater detail in the further text, and which floor crossmembers 14, 15, 16, 17 extend between respective side sills 18 which are arranged on the lower side of respective side walls 19.

Figure 3:
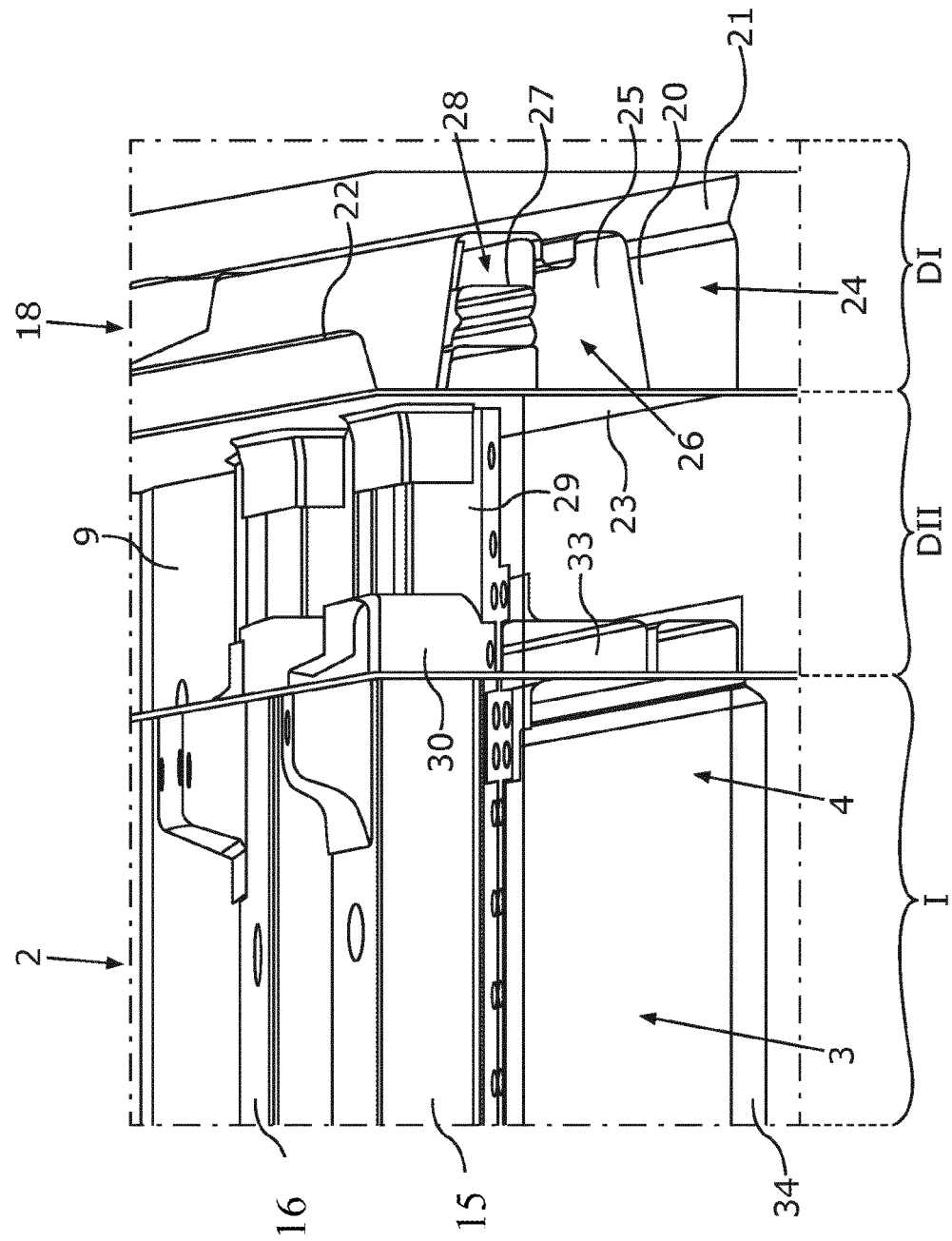
FIG. 3 shows details of an enlarged sectional view through the floor assembly of the motor vehicle according to FIGS. 1 and 2 along a sectional plane which can be seen in FIG. 2, is represented by the line III-III, and runs in the vehicle vertical direction and in the vehicle transverse direction.

It can be seen from a combination with FIG. 3 which shows the floor assembly in details of a sectional view along a sectional plane, indicated by the line III-III in FIG. 2 and running in the vehicle vertical direction (z-direction) and in the vehicle transverse direction (y-direction), in the region of the corresponding side sill 18 that the floor assembly has two deformation zones DI and DII which are intended to protect an inner zone I of the floor assembly or of the energy storage device 3 against damage in the case of a side-on impact with the post 1.

Here, the first, outer deformation zone DI of the floor assembly is configured in the region of the respective side sill 18, which first, outer deformation zone DI extends in the present case over the complete width, as viewed in the vehicle transverse direction (y-direction), of the side sill 18 or is formed by way of this side sill 18. Here, an inner, at least substantially L-shaped inner sill shell part 20 can be seen in FIG. 3, which inner sill shell part 20 runs from a lower outer flange 21 as far as an upper inner flange 22. Moreover, this inner sill shell part 20 is joined, in particular welded, to a flange 23 of the floor element 9.

In the present case, an outer sill shell part cannot be seen which is connected via the flanges 21 and 22 to the inner sill shell part 20 and configures a sill hollow chamber 24, in which a reinforcement part 25 is arranged in the present case. The reinforcement part 25 is of substantially U-shaped configuration in cross section and therefore configures a further hollow chamber 26 with the inner sill shell part 20, within which hollow chamber 26 an energy absorption element 27 is arranged in an upper part of the side sill 18. The energy absorption element 27 is formed, for example, from a sheet metal element by way of roll forming of corresponding hollow chambers 28.

It can be seen, furthermore, that the energy absorption element 27 is arranged in the vehicle vertical direction (z-direction) at least substantially in an overlap with or at the level of the respective floor crossmembers 14, 15, 16, 17. This results in a substantially torque-free support of the energy absorption element 27 on the vehicle floor 2 which comprises the respective floor crossmembers 14, 15, 16, 17 and the floor element 9, and therefore along with optimum forwarding of corresponding accident-induced forces.

The outer deformation zone DI is adjoined by the inner deformation zone DII which extends in the vehicle transverse direction (y-direction) toward the vehicle center starting from the inner wall region of the inner sill shell part 20 or from the inner end of the side sill 18. Here, the energy storage device 3 is arranged, with the formation of the second, inner deformation zone DII, in the vehicle transverse direction at a spacing from the first deformation zone DI or from the side sill 18 which here substantially forms the first deformation zone DI. The inner, second deformation zone DII ends toward the inside in the region of the energy storage device, in the region of which the inner zone I of the floor assembly is configured.

Here, the inner, second deformation zone DII is formed, inter alia, by virtue of the fact that the respective floor crossmembers 14, 15, 16, 17 are formed in the region of the inner zone I of the floor assembly 2 in a shell-like manner with an inner part shell 29 and an outer part shell, the inner, lower part shell 29 of the respective floor crossmember 14, 15, 16, 17 extending, as can be seen in particular from FIGS. 3 to 6, as far as the inner wall of the inner side sill part 20 of the side sill 18, but the respective outer part shell 30 of the corresponding floor crossmember 14, 15, 16, 17 extending at least substantially merely as far as into the region of the transition between the inner, second deformation zone DII and the inner zone I of the floor assembly. This targeted material saving or material weakening of the floor crossmembers 14, 15, 16, 17 achieves a situation where the second, inner deformation zone DII can be deformed under a lower load level than the inner zone I of the floor assembly, in which the energy storage device 3 is arranged.

Moreover, the respective side sill 18 with the reinforcement part 25 and the energy storage device 27 which form the outer, first deformation zone DI is configured and adapted in such a way that it can be deformed under a lower load level than the second, inner deformation zone DII and therefore also than the inner zone I of the floor assembly. This results in the desired way in a sequence of the deformation of the respective deformation zones DI and DII and a stable support of these deformation zones DI, DII on the inner zone I of the floor assembly, as will be described in yet greater detail in the further text in conjunction with FIG. 7.

Figure 4:
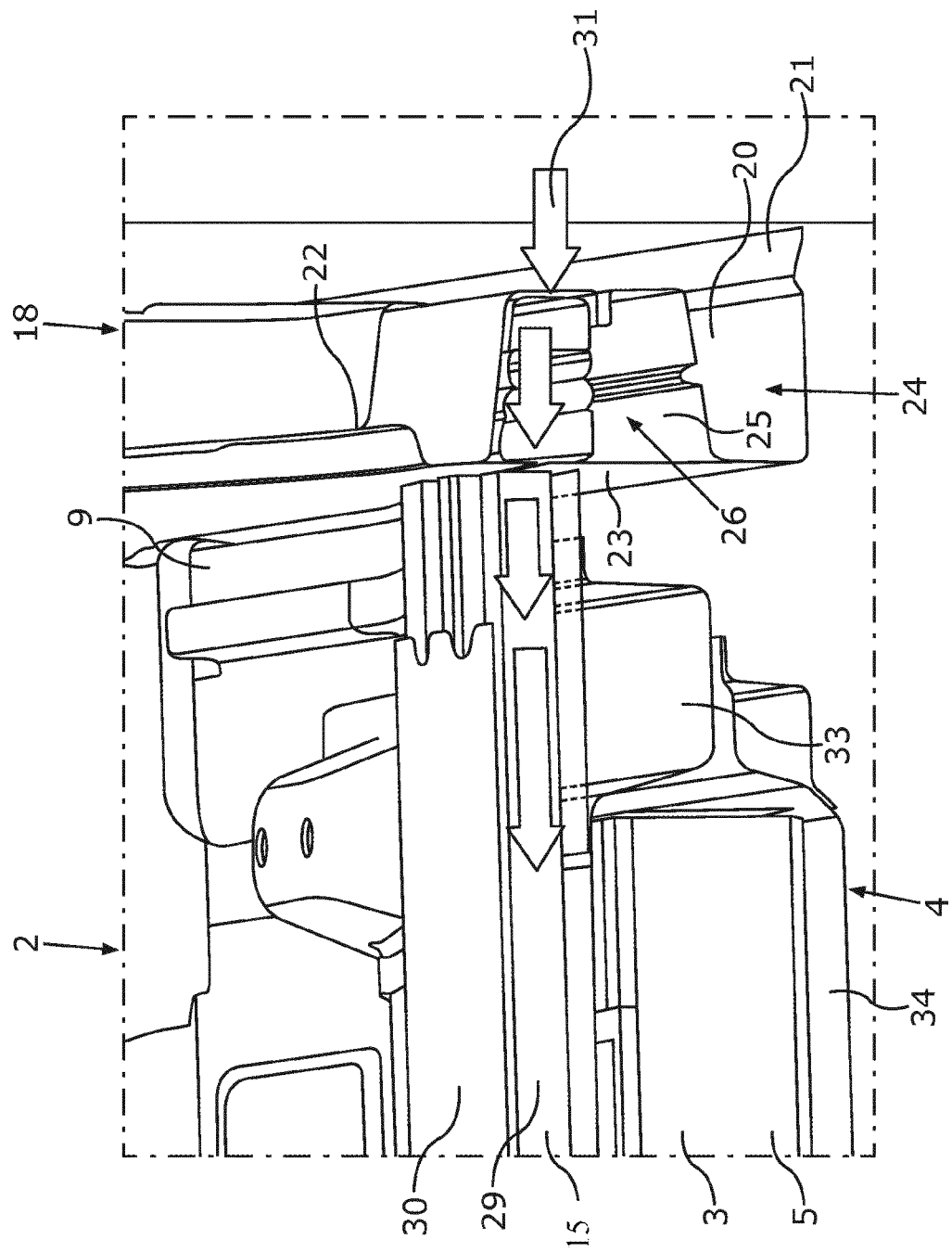
FIG. 4 shows details of a sectional view through the floor assembly in an analogous manner with respect to FIG. 3, a force flow being illustrated, in particular, in the case of accident-induced force loading of the floor assembly in the case of a side-on impact.

As can be seen, furthermore, from FIG. 4 which, in an analogous manner with respect to FIG. 3, shows details of a sectional view through the floor assembly, the energy absorption element 27, in particular, is dimensioned and arranged at the level of the vehicle floor 2 and in an overlap with the respective floor crossmembers 14, 15, 16, 17 in such a way that, in the case of an accident-induced introduction of force, an optimum support of the energy absorption element 27 results and, as shown by way of the arrows 31, an optimum load input into the respective floor crossmembers 14, 15, 16, 17 can be realized. Here, with the vehicle floor 2 which comprises the floor element 9 and the floor crossmembers 14, 15, 16, 17, the energy absorption element 27 forms an upper load path according to the arrows 31, via which upper load path the introduced energy is input. This is important, in particular, because no second, lower load path can be configured at the level of a lower part region of the side sill 18 on account of missing crossmembers in the region of the energy storage device 3 and on account of the spacing of the storage housing 4 from the side sill 18.

Figure 5:
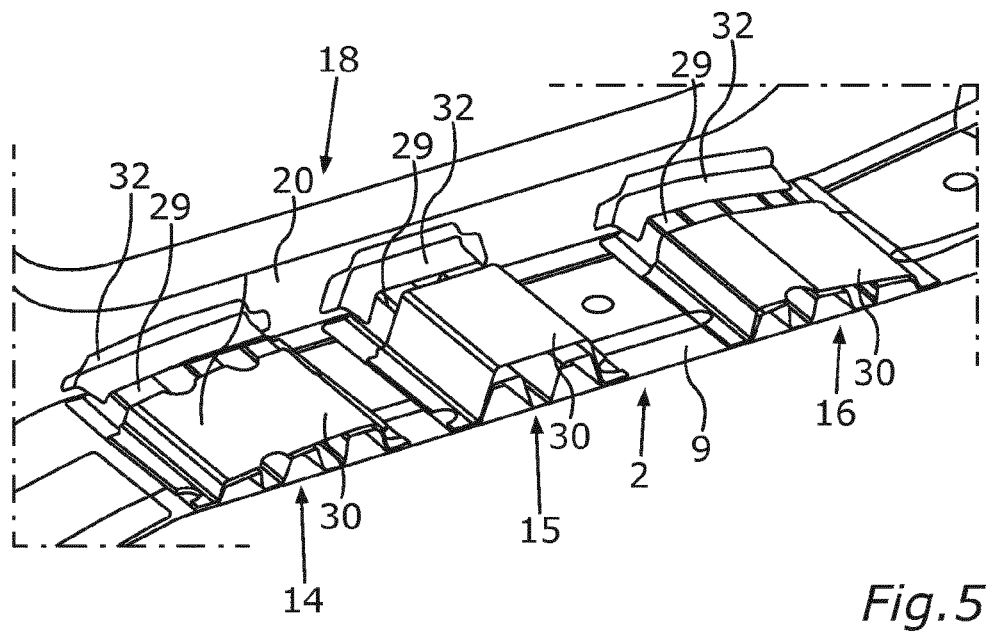
FIG. 5 shows details of a perspective view of the attachment of the respective floor crossmembers to the laterally respectively associated side sill.
Figure 6:
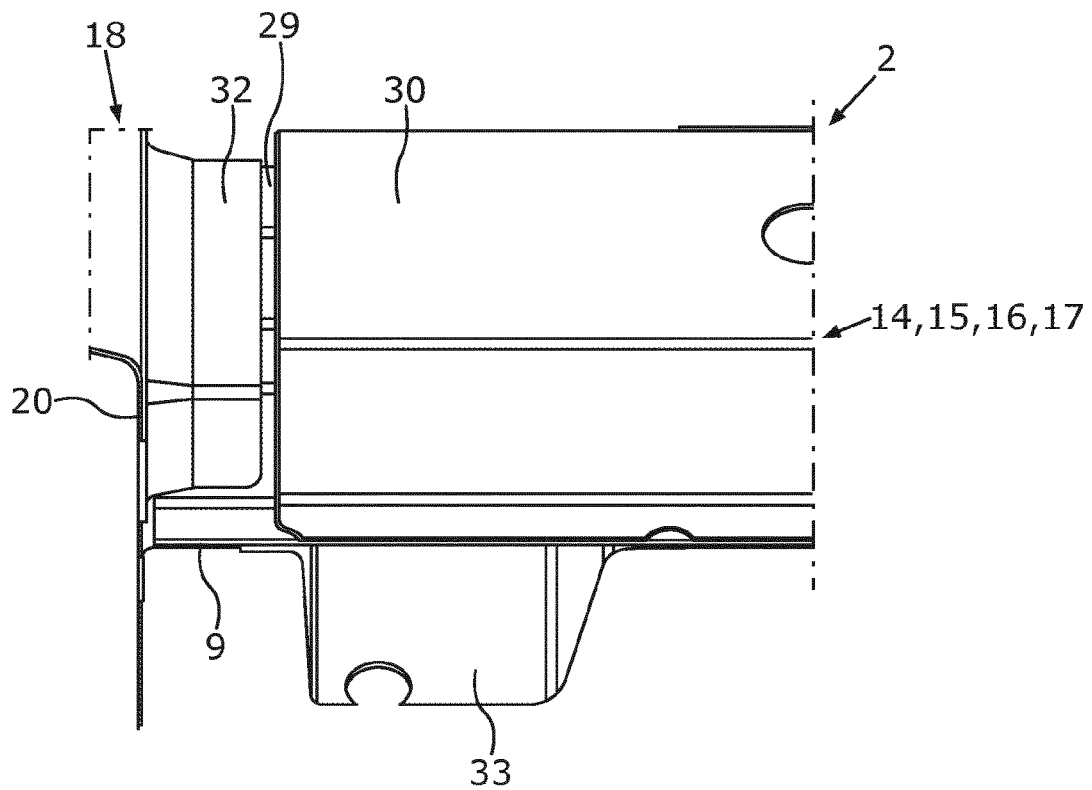
FIG. 6 shows details of a sectioned perspective view of the floor assembly in the region of the attachment of one of the floor crossmembers to the laterally corresponding side sill.

FIGS. 5 and 6 in each case show details of a perspective sectional view of the arrangement and support of the respective floor crossmembers 14, 15, 16, 17 on the upper side of the corresponding floor element 9 of the vehicle floor 2 and their support on the inner side of the respective laterally associated side sill 18. In the present case, both the inner part shells 29 and the outer part shells 30 of the respective floor crossmember 14, 15, 16, 17 are configured, for example, as roll-formed profiles from high strength steel with a tensile strength $R_m$ of >1000 MPa. Here, the respective inner part shell 29 is joined on the upper side of the floor element via respective flange connections. The respective outer part shell 30 is joined on corresponding outer flanges of the inner part shell 29.

Furthermore, it can be seen from FIGS. 5 and 6 that the outer part shells 30 lie at a lateral spacing from the side sill 18 and are accordingly of shorter configuration than the respective inner part shells 29 which project as far as at least substantially the respective side sills 18. As a result, as has already been described, the configuration of the inner, second deformation zone DII and the load-related graduation from the second to the first deformation zone DII, DII are achieved, inter alia.

The floor crossmembers 14, 15, 16, 17 are received with their respective ends between the floor element 9 and a respective associated flange element 32 which is arranged on the respective side sill 18 and is supported on the upper side of the ends of the respective floor crossmember 14, 15, 16, 17. In other words, the flange elements 32 are supported from above against the inner part shell 29 of the respective floor crossmember 14, 15, 16, 17. Here, the flange elements 32 are welded on the inner side to the corresponding side sill 18. The connection to the respective floor crossmember 14, 15, 16, 17 can likewise take place by way of welding or another joining technique or mechanical connection.

As can be seen in combination with FIGS. 4 and 6, a respective longitudinal beam is provided on the lower side of the vehicle floor 2 or the floor element 9 and on the outer side of the energy storage device 3, which respective longitudinal beam is of at least substantially U-shaped design and is joined from below against the floor element 9. Moreover, the inner side of this floor longitudinal beam 33 delimits the second deformation zone DII. This means that, during the course of a load input and after deformation of the first deformation zone DI, the second deformation zone DII may be deformed at most as far as the inner side of the bottom longitudinal beam 33, since the inner zone I then begins, in which the energy storage device 3 is arranged.

Furthermore, it can be seen from FIG. 4 that a lower housing part 34 of the storage housing 4 of the energy storage device 3 is fastened on the lower side to the floor longitudinal beam 33. Here, sealing of the floor element 9 with respect to the floor longitudinal beam 33 and in the further course with respect to the lower housing part 34 can possibly take place, in order therefore to house the energy storage device 3 in a manner which is integrated into the vehicle body. As an alternative to this, the energy storage device can also be housed in a separate storage housing 4 which is fastened to the lower side of the vehicle floor 3.

Figure 7:
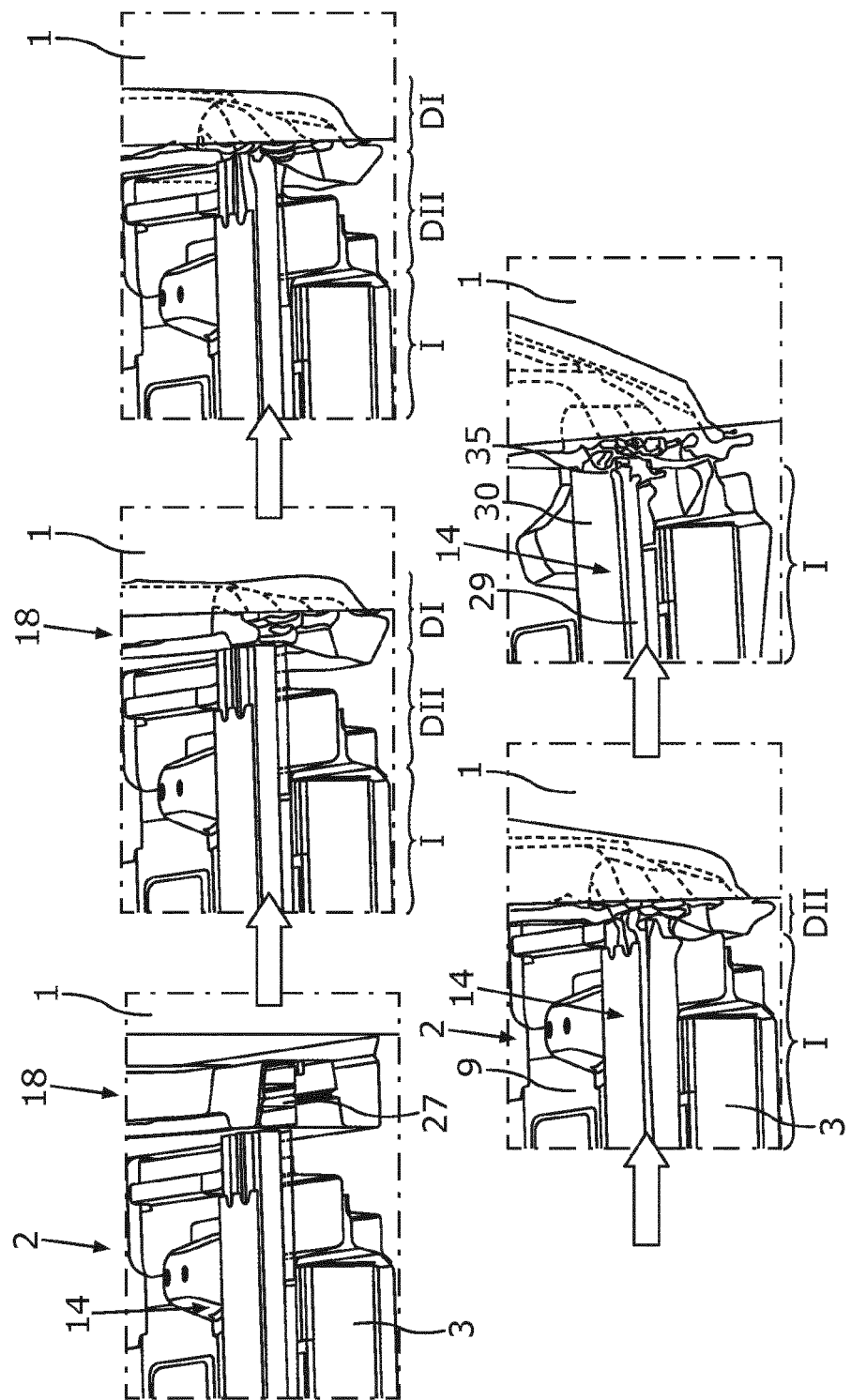
FIG. 7 shows respective sectional views of the floor assembly in an analogous manner with respect to FIGS. 3 and 4, it being possible for a sequence of the deformation of the respective components of the floor assembly to be seen in the case of accident-induced force loading as a consequence of a side-on impact.

Finally, the method of operation of the floor assembly in the case of an impact with the post 1 is to be explained on the basis of FIG. 7. Here, FIG. 7 shows respective sectional views, in an analogous manner with respect to FIGS. 3 and 4, of a sequence of the deformation in the case of the impact of the floor assembly or the car on the post 1.

Here, the illustration at the top left shows the floor assembly in the undeformed state before the impact on the post 1. The middle upper illustration in FIG. 7 shows, after the impact of the post 1, the deformation of the first deformation zone DI or the side sill 18 which can be deformed with a correspondingly lower load level than the inner or second deformation zone DII which is arranged on the inner side thereof. This second deformation zone DII withstands the load level and is not yet deformed at the time shown in the middle illustration of FIG. 7. Furthermore, it can be seen in the right-hand upper illustration of FIG. 7 how the outer, first deformation zone DI or the side sill 18 is substantially completely used up and, in the case of further force loading, the deformation of the second, inner deformation zone DII is initiated after a certain load level is reached or the first deformation zone DI has gone solid.

Since the second deformation zone DII can be deformed under a lower load level than the rigid, inner zone I of the floor assembly, this inner zone I remains at least substantially intact in an undeformed manner. In accordance with the left-hand lower illustration in FIG. 7, at least part of the inner, second deformation zone DII is deformed with the absorption of further impact energy in the further course of the accident scenario, the robust inner zone I protecting the energy storage device 3 and the storage housing 4 against considerable damage and leaks, since the energy has been dissipated completely in the two deformation zones DI and DII. The right-hand lower illustration in FIG. 7 shows the floor assembly after conclusion of the side-on impact, in the case of which the floor assembly or the car has already detached itself slightly from the post 1. Optimum creasing 35 of the inner part shell 29 of the respective floor crossmembers 14, 15, 16 for maximum energy absorption in the region of the reinforcements of the respective floor crossmembers 14, 15, 16, 17 can be seen here.

LIST OF DESIGNATIONS

1 Post
2 Vehicle floor
3 Energy storage device
4 Storage housing
5 Battery module
6 Main floor
7 Bulkhead
8 Heel plate
9 Floor element
10 Floor element
11 Crossmember
12 Rear part of the vehicle
13 Front part of the vehicle
14 Floor crossmember
15 Floor crossmember
16 Floor crossmember
17 Floor crossmember
18 Side sill
19 Side wall
20 Inner sill shell part
21 Flange
22 Flange
23 Flange
24 Sill hollow chamber
25 Reinforcement part
26 Hollow chamber
27 Energy absorption element
28 Hollow chamber
29 Part shell
30 Part shell
31 Arrow
32 Flange element
33 Floor longitudinal beam
34 Housing part
35 Creasing
DI Deformation zone
DII Deformation zone
I Inner zone
$R_m$ Tensile strength

What is claimed is:

1. A floor assembly for an electrically operable motor vehicle, comprising:

a vehicle floor which runs on an upper side of an energy storage device for driving the motor vehicle, has at least one floor element, and is adjoined on each outer side by respective side sills;

a first, outer, deformation zone of the floor assembly configured in a region of the side sills, from which first, outer deformation zone the energy storage device is arranged at a spacing in a vehicle transverse direction so as to form a second, inner, deformation zone, wherein the first, outer, deformation zone is deformable under a lower load level than the second, inner, deformation zone; and at least one floor crossmember that is provided on an upper side of the floor element of the vehicle floor, wherein the at least one floor crossmember consists of two parts, an inner part shell and an outer part shell, which are disposed in the second deformation zone where they are configured to absorb impact energy.

2. The floor assembly according to claim 1, wherein the second, inner deformation zone is deformable under a lower load level than an inner zone of the floor assembly in a region of the energy storage device.

3. The floor assembly according to claim 2, wherein the at least one floor crossmember is deformable under a lower load level than the inner zone of the floor assembly in the region of the energy storage device.

4. The floor assembly according to claim 3, further comprising:

a respective energy absorption element provided in a sill hollow chamber of the respective side sill.

5. The floor assembly according to claim 4, wherein the energy absorption element is arranged in an upper part region of the sill hollow chamber of the respective side sill.

6. The floor assembly according to claim 5, wherein the energy absorption element is arranged in a vehicle vertical direction at least substantially in an overlap with the floor crossmembers.

7. The floor assembly according to claim 1, further comprising:

a respective energy absorption element provided in a sill hollow chamber of the respective side sill.

8. The floor assembly according to claim 1, wherein the energy storage device is configured so as to not include any crossmembers.

9. The floor assembly according to claim 1, wherein a respective floor longitudinal beam is provided on a lower side of the vehicle floor and on the outer side of the energy storage device, which respective floor longitudinal beam delimits the second, inner deformation zone toward the vehicle center.

* * * * *